United States Patent [19]

Güttel

[11] 4,285,497
[45] Aug. 25, 1981

[54] ELECTROMAGNETICALLY ACTUATED VALVE

[75] Inventor: Otto Güttel, Ingelfingen, Fed. Rep. of Germany

[73] Assignee: Burkert GmbH, Ingelfingen, Fed. Rep. of Germany

[21] Appl. No.: 201,897

[22] Filed: Oct. 29, 1980

Related U.S. Application Data

[63] Continuation of Ser. No. 906,283, May 15, 1978.

[30] Foreign Application Priority Data

Jun. 2, 1977 [DE] Fed. Rep. of Germany ....... 2724901

[51] Int. Cl.$^3$ .................. F16K 11/02; F16K 1/16; F16K 31/10
[52] U.S. Cl. .................. 251/138; 137/625.44; 137/625.65; 137/875
[58] Field of Search .................. 251/138, 77; 137/625.44, 875, 625.65

[56] References Cited

U.S. PATENT DOCUMENTS

| | | | |
|---|---|---|---|
| 1,964,281 | 6/1934 | Young et al. | 251/138 X |
| 2,052,246 | 8/1936 | Ray | 251/129 X |
| 2,562,631 | 7/1951 | Morrison | 251/138 X |
| 2,947,510 | 8/1960 | Ray | 251/138 X |
| 3,017,156 | 1/1962 | Lemberger | 251/77 X |
| 3,211,417 | 10/1915 | Ray | 251/77 X |
| 3,414,012 | 12/1968 | Webb | 251/138 X |

FOREIGN PATENT DOCUMENTS 911771 11/1962 United Kingdom ............ 251/138

*Primary Examiner*—Arnold Rosenthal
*Attorney, Agent, or Firm*—Edwin E. Greigg

[57] ABSTRACT

An electromagnetic valve for handling fluid media has a valve mechanism which includes at least one valve seat and a valve-closing member which cooperates with the valve seat or seats. The motion of the valve-closing member is controlled by linkage that is connected to the moving arm of an electromagnet, while a return spring urges the armature in the direction opposite to the magnetic force. In order to permit the seating of the armature against a stop at the limit of its energized travel, while exerting a calibrated force on the valve seat, the armature is permitted to travel beyond the point at which the valve-closing member is arrested. The additional motion of the armature takes place against the force of an auxiliary spring which compresses during that part of the motion. When the coil is de-energized, the auxiliary spring urges the armature back into direct contact with the linkage, whereafter the motion transfer is loss-free.

1 Claim, 4 Drawing Figures

ELECTROMAGNETICALLY ACTUATED VALVE

This is a continuation of application Ser. No. 906,283 filed May 15, 1978.

BACKGROUND OF THE INVENTION

The invention relates to solenoid-actuated valves to control the flow of fluid media. More particularly, the invention relates to solenoid-actuated valves in which one motion of the valve-closing element is provided by magnetic force while the opposing motion is actuated by elastic means, for example coil springs. Solenoid actuated, i.e. electromagnetically actuated, valves of this type are known in the art. In the previously known valves, the valve-closing element has only very little elasticity. Accordingly, the transfer of motion from the solenoid and its armature to the valve-closing element, which is rigid and direct, requires very precise adjustment of the relative positions of the valve-closing member and the valve seat so that the solenoid armature will be in its final position exactly when the valve-closing element exerts the correct pressure on the valve seat. If this correct alignment and adjustment is not made, the armature is not seated when the valve is closed and will draw excessive current, possibly inviting damage or burn-out of the magnetic coil.

OBJECT AND SUMMARY OF THE INVENTION

It is thus a principal object of the present invention to provide a solenoid-actuated valve to control the flow of a fluid medium and in which reliable valve closure is obtained while insuring the secure berthing of the armature in its terminal position so as to prevent overloading the magnetic coil. It is a further principal object of the present invention to provide a solenoid valve which does not require a precise adjustment of the position of the valve seat prior to, or after, installation.

These and other objects are attained according to the present invention by providing a solenoid-actuated valve in which the motion of the magnetic armature is transmitted to the valve-closing element substantially without play during the major portion of the travel of the armature. The invention then further provides that the armature can execute an additional motion against elastic forces to increase the force on the valve-closing element while at the same time permitting the berthing, or stress-relieving seating, of the armature against a stop. The invention further provides that, when the valve is actuated in the opposite direction, the armature traverses the additional displacement and makes form-fitting contact with the valve closing member through an appropriate linkage and substantially without loss of motion.

The above object is attained in accordance with the invention in that, in valves of the general type described above, a spring is disposed between the armature and the members transmitting the motion of the armature onto the closing member, the spring enabling, upon the termination in a substantially lost-motion manner of the movement capacity of the transmitting members under the effect of a magnet, an additional motion of the armature into the attracting final position relative to the transmitting member, which spring is overbridged in the returning direction, after the return of the armature from the additional movement, by means of lost motion between the armature and the transmitting members.

In all applications for which the solenoid valves of the present invention are used, even in a two-port, two-position valve in which the valve is open when not energized, it is possible to use the valves without an exact adjustment of the valve seats. Accordingly, the valve seats may be threaded into the valve housing against a firm stop which simplifies the installation and any subsequent service. However, even in valves where the valve seats are deliberately adjustable, the same advantages are obtained, because less attention must be paid during the first installation and subsequent exchange to the precision of the valve seat location because, according to the present invention, the largest stroke of the armature may be made larger than that required for producing the valve-closing displacement.

It is a distinct feature of the invention that the transfer of motion from the armature to the valve-closing member is performed by an attached pin having lateral play which is subject to an elastic force exerted between the pin and the armature. The pin is attached in the manner of a hook which prevents fractures such as might occur in an actuating pin which is made of one piece and rigidly attached, due to lateral oscillations occurring during the magnetic energization. It is a space-saving feature of an embodiment of the present invention that the actuating pin is located in the concentric hollow space of the armature and is hooked onto a swivel joint, while the spring which opposes the additional motion of the armature is disposed between an enlarged portion of the actuating pin and a shoulder within the hollow interior of the armature. The return spring for the armature is concentric with the excess motion spring described above and is supported by the same shoulder of the armature on one side and by the housing of the valve on the other side.

The invention will be better understood as well as further objects and advantages thereof become more apparent from the ensuing detailed description of two preferred embodiments taken in conjunction with the drawing.

DESCRIPTION OF THE PREFERRED EMBODIMENTS

Figure 1:
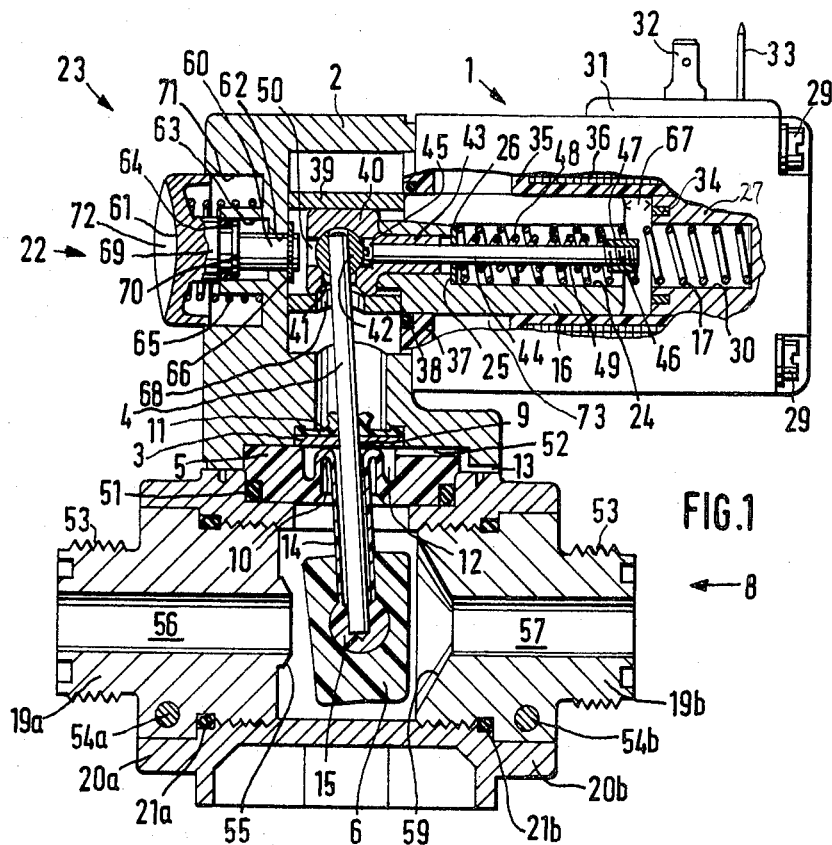
FIG. 1 is a front-elevational sectional drawing through a first embodiment according to the invention in a two-port, two-position solenoid valve of the type which is open when not energized.
Figure 2:
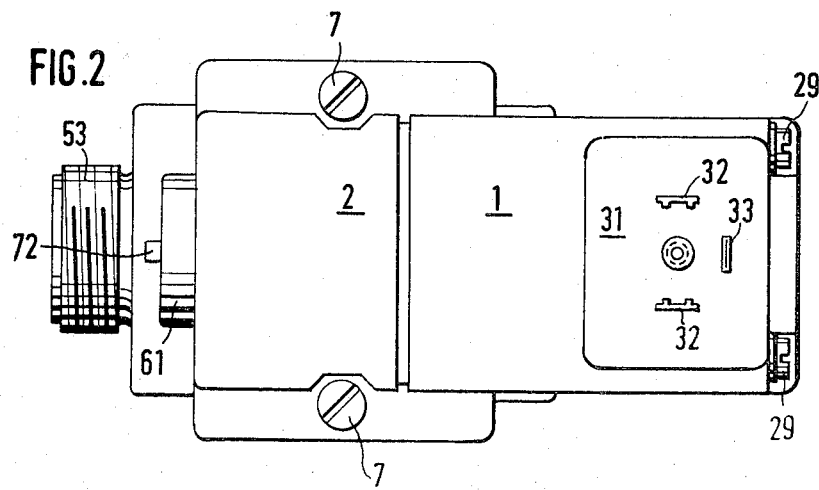
FIG. 2 is a top view of the valve illustrated in FIG. 1.

Turning now to the first embodiment of the invention illustrated in FIGS. 1 and 2, there is illustrated the electromagnetic actuating system 1 attached with screws 29 to a mechanical actuating unit 23 housed within an angular housing 2. The actuating unit 23 is mounted on the valve housing 8 by means of two screws 7, best seen in FIG. 2. A diaphragm-like member 5 separates the interior volume of the actuating unit 23 from the interior space of the valve housing 8. The axially movable magnetic armature 16 is connected to a valve-closing member 6, disposed within the valve housing 8, by means of an actuating rod 4 whose end extending into the valve housing is enclosed by a resilient dome-shaped extension 14 of the diaphragm-like member 5.

The construction of the solenoidal actuation system and the associated actuating unit 23 is as follows. A coil 36 is wound on a coil carrier 35 and lies in contact with a laminar iron yoke 73. These three parts are completely surrounded by a pressed mass 37 of, for example, epoxy resin. Electrical current is supplied to the coil 36 via an electrical pin receptacle 31 which may include contacts 32 and a ground contact 33 that serves as an alignment fixture. An armature guide tube within the coil 36 holds and guides the armature 16 so as to permit the axial displacement thereof. The armature itself has a cylindrical interior 24 at one end of which there is formed a shoulder 25 beyond which the interior 24 extends with reduced diameter. A disc 26 lies on the shoulder 25 and supports the flange of a tubular bushing 49. A soft iron plug 27 is placed in the iron yoke 73. The plug 27 has a hollow interior 30 which is coaxial with the cylindrical space 24. A compression spring 17 is supported at one side by the disc 26 and on the other side by the base of the hollow interior 30. The spring 17 is the primary return spring for the armature 16 in the unenergized condition of the valve. FIG. 1 shows the elements of the valve in the position in which the armature 16 has been placed into its extreme left position as shown in the drawing due to the force of the spring 17. In that position, the right face of the armature 16 is remote from the face of the plug 27 by a distance 67. The face of the plug 27 contains a copper ring 34 which tends to short-circuit the magnetic current and causes a smoothing of the magnetic force which is generally sinusoidal in A.C.-actuated magnets.

The magnetic armature 16 has a lengthwise slot which is not shown and which serves to reduce eddy currents in the armature and also serves as a channel for communication between the two spaces at opposite sides of the armature permitting a fluid medium to flow between these spaces during the motion of the armature in the channel.

Figure 4:
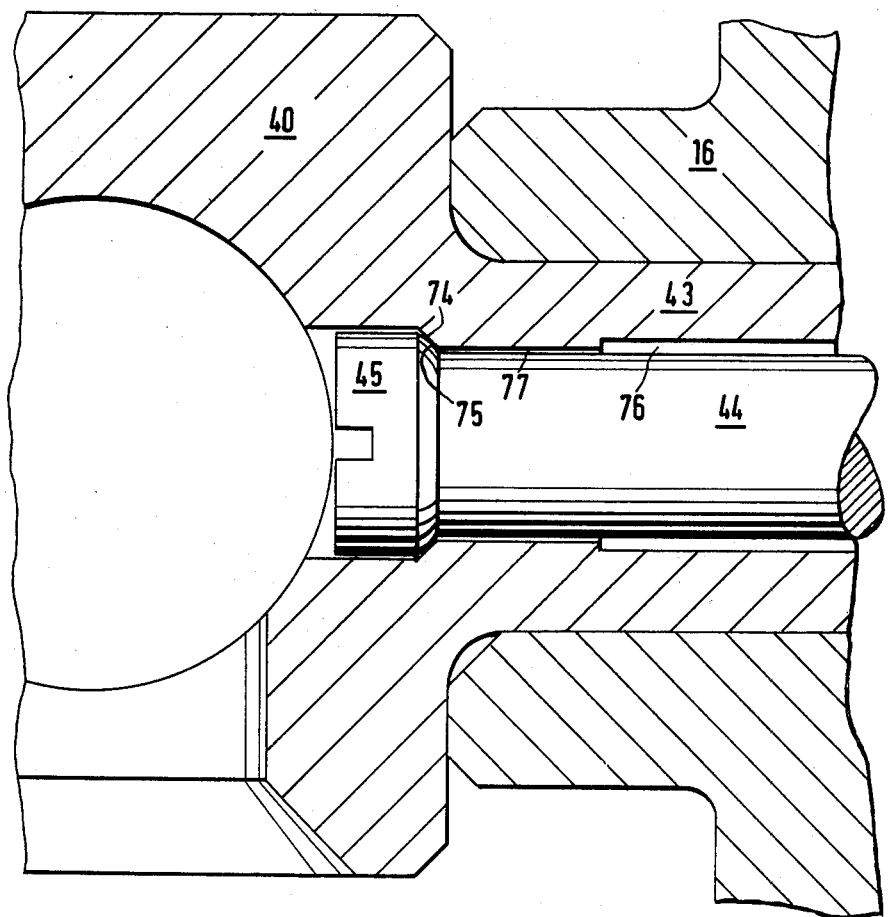
FIG. 4 is an enlarged illustration of the suspension of the actuating pin.

Coupled to the left end of the armature 16, as seen in FIG. 1, is a pivotal joint 40, shown in detail in FIG. 4, having a sleeve-like extension or bushing 43 of reduced diameter and coaxial with the armature 16. An actuating pin 44 penetrates the bushing 43 with a slotted head 45 which traverses the disc 26 as well as the bushing 49 and which extends through and beyond the armature 16 within the spring 17. At its right end, as seen in FIG. 1, the pin 44 has threads 46 carrying a nut 47 which is secured against rotation by riveting. A secondary compression spring 48 surrounds the bushing 49 and is supported at one end by the nut 47 while it is supported at the other end on the disc 26, thereby tending to pull the head 45 of the pin 44 down onto an interior shoulder 74 within the pivotal joint 40. The shoulder 74 is a conical surface inclined at approximately 45°, as best seen in FIG. 4, whereas the lower part of the head 45 of the pin 44 has a spherical or convex bulge 75 at the points at which it makes contact with the conical surface of the shoulder 74. The lateral play 76 between the interior of the bushing 43 and the pin 44 is substantial and is reduced somewhat in a region closer to the head of the pin at the location 77. The considerable amounts of play 77 and 76 as well as the contact of the convex surface 75 with the plane surface 74 permits relatively unimpeded lateral motion of the pin and thereby renders the pin laterally movable in response to any oscillations generated by the magnetic excitation.

The forces of the spring 17 as well as the spring 48 tend to push the armature 16 over the extension 43 of the pivotal joint 40 into contact with the face of the larger diameter portion of the pivotal joint 40. The pivotal joint 40 has an opening 50 of at least the diameter of the head 45 so as to permit the insertion of the pin 44 therethrough. The central void of the pivotal joint 40 contains a pivoting cradle 42 which holds one end of a two-armed lever constituted by a rod 4 which passes through an opening 41 in the bottom of the pivotal joint 40 and whose position is substantially perpendicular to the axis of the actuating pin 44. A spacer bushing 39 is inserted in the housing 2 and surrounds the pivotal joint 40 with a small amount of play. It is the purpose of the spacer bushing 39 to define the angular position of the rod 4 in the deenergized condition as shown in FIG. 1 for a normally open, two-port, two-position valve. The outer diameter of the bushing 39 is chosen to be somewhat smaller than that of the armature 16, thereby permitting its insertion into the guide bore for the armature.

The bushing 39 has a suitable passage 68 for the rod 4 permitting the motions of the rod 4 which result from the axial displacement of the armature 16 and the pivotal joint 40 by an amount equal to the stroke 67.

The solenoidal system 1 is surrounded by a pressed enclosure 37 which has an opening permitting the motion of the armature 16 that is sealed to the outside by means of an O-ring 38.

When the magnetic coil 36 is supplied with electric current, the armature is moved to the right as seen in FIG. 1. When the current is interrupted, the spring 17 returns the armature to the position illustrated in FIG. 1, i.e. to the left. The effect and purpose of the secondary internal spring 48 will be described in detail below.

The actuating unit 23 also includes a manual actuation mechanism 22. The latter includes a bolt 60 moving in a bore 62 of the housing 2 and being equipped at the leftmost end with an actuating cap 61. The cap 61 has a concave top with an extending rib 72. A portion 69 of the bolt 60 fits into an enlarged bore 63 of the housing 2. An O-ring 64 placed between the portion 69 and a collar 70 of the bolt 60 seals the latter with respect to the exterior. The cap 61 may be pushed into a recess 71 in the housing 2. A compression spring 65 urges the cap 61 out of the housing 2. A split ring 66 is mounted on the end of the bolt to keep it from passing out of the housing 2. When depressed, the cap 61 may be held in that position by a suitable detent which is engaged, for example, by partial rotation of the cap 61. In the example illustrated in FIGS. 1 and 2 of a two-port, two-position valve, the valve housing 8, which is coupled to the actuating unit 23 by means of screws 7, is provided with two opposite connecting tubulations 20a and 20b. The tubulation 20a contains a valve seat 19a which is threadedly and fixedly inserted into attachment with an interior shoulder of the housing via a sealing ring 21a. The valve seat is provided externally with attachment threads 53. The final position of the valve seat is secured by a lateral pin 54a. At the inner end, the valve seat 19a has an edge 55 constituting the terminus of a conduit 56 for the medium flowing through the valve.

A similar and opposite tubulation 19b is threadedly attached in the same manner as the element 19a. The interior of the element 19b is a channel 57 terminating in a funnel-like transition region 59. A lateral pin 54b secures the position of the tubulation 19b.

The actuating unit 23 and the valve housing 2 are separated by the diaphragm-like member 5 which is disposed in recesses of the housing 2 and of the valve housing 8 and is located in a depression in the housing 2. In an associated recess of the valve housing 8, a sealing ring 51 provides additional sealing. The central portion of the diaphragm-like member 5 is thin-walled and forms a bulge which is continued in an extension 14, thereby forming an annular rolled portion 10 which makes contact from below with a disc 3 supported by a shoulder. An elastomeric diaphragm seal 11 is located above the disc 3. The rod 4 which engages the pivot 42 in the pivotal head 40 passes through the diaphragm seal 11 as well as the disc 3 and passes into the surrounding extension 14 to the general region of the conduits 56, 57. The bottom end of the rod 4 is contained in a spherical member 15 which may surround the extension 14 or may be a part of it and which carries an elastically deformable valve-closing element 6 which may be snapped onto it or buttoned onto it.

In the illustrated open position of the valve, the valve-closing element 6 has been lifted from the edge 55 of the valve seating tubulation 19a. The spring 17 causes the face of the armature 16 to be in contact with the face of the spacer bushing 39.

When the coil 36 is now supplied with current, the armature 16 is pulled into the coil, i.e. to the right in the figure in opposition to the force of the spring 17, thereby pivoting the rod 4 about an edge bearing 9 provided by edges in the disc 3 and engaging the central part of the rod 4, thereby creating a lever having two arms, the lower of which is surrounded by the extension 14 and guides the valve closing element 6 until it makes contact with the valve seat edge 55. The sphere 15 permits a pivotal displacement of the valve-closing element 6, thereby insuring an overall and sealing attachment of the valve seating element on the valve seat edge.

When the rod 4 is pivoted about the edge bearing 9, the extension 14 of the diaphragm-like element 5 is also pivoted, thereby causing a rolling action of the annular bulge 10 on the bottom face of the disc 3 while being elastically deformed. The edges of the bearing 9 are preferably provided by the lower surface of the disc 3.

The space 12 which is formed between the diaphragm seal 11 and the diaphragm-like member 5 below the disc 3 communicates through a groove 52 and a channel 13 to the outside. The various dimensions of the parts are so chosen that, when the valve-closing member 6 is in contact with the sealing edge 55 and is slightly compressed by the force exerted on it, the armature 16 will still not have traversed the entire distance 67, but will be positioned a short distance away from the stop ring 34. This intermediate position, however, could not constitute the final position of the armature 16 because it would entail excessively high currents in the coil 36 which might cause its destruction. In order to permit a further motion of the armature 16 to traverse the remaining part of the distance 67 and to come into final stress-relieving contact with the stop ring 34, the internal secondary spring 48 is submitted to an additional compression while the pivotal joint 40 remains in the position where it defines the chosen final location of the valve-closing element 6 on the valve seat 55. The armature 16 thus executes a relative displacement with respect to the pivotal joint 40 which is equal to the additional axial compression of the primary return spring 17 and its left end is displaced by this distance from the pivotal joint 40. The force exerted by the primary return spring 17 as well as the additional compression force due to the additional motion of the armature 16 relative to the pivotal joint 40 is in opposition to the magnetic force and tends to diminish the pressure exerted by the closing member 6 on the edge 55. However, and conversely, the additional compressive force exerted on the internal secondary spring 48 by the magnetic force tends to increase the closure force exerted on the valve-closing member 6.

Figure 3:
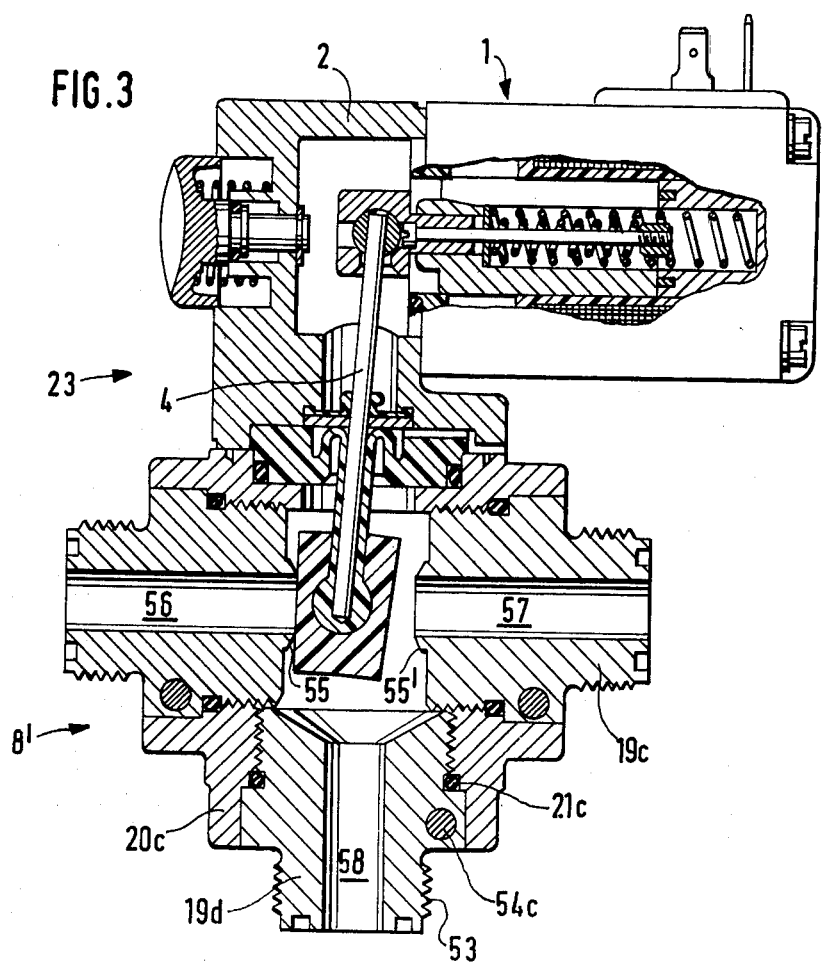
FIG. 3 is a front elevational sectional view of a second embodiment of the valve according to the invention in a three-port, two-position solenoid valve in which one of its positions is occupied under spring pressure alone.

A second embodiment of the solenoid valve according to the present invention is illustrated in detail in FIG. 3 where there is shown a three-port, two-position valve in a housing 8'. The actuating elements in this embodiment are identical to those of the first exemplary embodiment illustrated in FIGS. 1 and 2. The various elements in FIG. 3 are drawn in the position in which the valve-closing member 6 is in contact with the valve seat edge 55. The place of the tubulation 19b is in this case taken by a tubulation 19c which contains a second valve seat edge 55' that can cooperate with the valve-closing member 6 to close the conduit 57 in the position opposite to that illustrated in FIG. 3. The bottom of the valve housing 8' is provided with a tubulation 20c in which there is threadedly engaged an element 19d which substantially corresponds to the element 19b of FIG. 1. The element 19d has an internal channel 58 terminating in a conical region 59 and is provided with external threads 53.

The foregoing relates to preferred exemplary embodiments of the invention, it being understood that other embodiments and variants thereof are possible within the spirit and scope of the invention.

What is claimed and desired to be secured by Letters Patent of the United States is:

1. A direct-acting magnetic valve for fluid media comprising an actuating unit, a magnetic actuating system including an armature connected to said actuating unit, said armature being movable in one direction by magnetic force and a primary return spring for moving said armature in the opposite direction, a valve unit having a housing connected to said actuating unit, said valve unit including at least one valve seat and a movable valve closing member disposed within said housing, means for transmitting the motion of said armature to said closing member for closing engagement with said at least one valve seat, a secondary spring disposed between said armature and said motion transmitting means concentrically with said primary return spring, said secondary spring being adapted to permit an additional movement of said armature by said magnetic actuating system with lost motion upon the termination of the action of said motion transmitting means into a final position relative to said motion transmitting means, said secondary spring exerting a compression force in the opposite direction of movement of said armature after the return of said armature from said additional movement caused by said lost motion between said armature and said motion transmitting means, said motion transmitting means including a rod having one end connected to said movable valve closing member and pivot means for connecting the other end of said rod to said armature with said rod being disposed in substantially vertically extending relationship with respect to the axis of said armature, said motion transmitting means including a drawing pin, means for supporting said pin for transverse play, said armature being continuously urged in said opposite direction by said primary return spring, said secondary spring comprising a compression spring disposed between said pin and said armature, said armature being provided with an axially disposed hollow space forming a shoulder at one end, said motion transmitting means including a pivotal joint, said pin being disposed centrally in said armature hollow space, said pin supporting means including said pivotal joint, one end of said pin including a nut said compression spring being disposed between said pin with one end in engagement with said nut and said shoulder and said return spring being disposed in surrounding relationship with said compression spring within said hollow space with one end in contact with said shoulder and the other end in contact with said housing.

* * * * *

UNITED STATES PATENT AND TRADEMARK OFFICE
CERTIFICATE OF CORRECTION

PATENT NO. : 4,285,497

DATED : August 25, 1981

INVENTOR(S) : Otto Gottel

It is certified that error appears in the above—identified patent and that said Letters Patent is hereby corrected as shown below:

On the title page, Item (75), the name of the inventor should read -- Otto Göttel --.

Signed and Sealed this

Nineteenth Day of January 1982

[SEAL]

Attest:

GERALD J. MOSSINGHOFF

*Attesting Officer*     *Commissioner of Patents and Trademarks*